(12) United States Patent
Wajs (10) Patent No.: US 8,150,209 B2
(45) Date of Patent: Apr. 3, 2012

(54) METHOD OF FORMING A COMBINED IMAGE BASED ON A PLURALITY OF IMAGE FRAMES

(75) Inventor: Andrew Augustine Wajs, Haarlem (NL)

(73) Assignee: Active Optics Pty Limited, Carlingford (AU)

( * ) Notice: Subject to any disclaimer, the term of this patent is extended or adjusted under 35 U.S.C. 154(b) by 743 days.

(21) Appl. No.: 12/090,000

(22) PCT Filed: Oct. 12, 2005

(86) PCT No.: PCT/EP2005/055188
§ 371 (c)(1),
(2), (4) Date: Sep. 8, 2008

(87) PCT Pub. No.: WO2007/042075
PCT Pub. Date: Apr. 19, 2007

(65) Prior Publication Data
US 2009/0220172 A1  Sep. 3, 2009

(51) Int. Cl.
*G06K 9/36* (2006.01)
(52) U.S. Cl. .......................................... 382/284
(58) Field of Classification Search .......... 382/128–134, 382/279, 284
See application file for complete search history.

(56) References Cited

U.S. PATENT DOCUMENTS 5,091,972 A * 2/1992 Kwon et al. ................... 382/277
(Continued)

FOREIGN PATENT DOCUMENTS
EP  0592196 A2  4/1994
(Continued)

OTHER PUBLICATIONS

W. Beck, "Image enhancement and moving target detection in IR image sequences", Proceedings of the SPIE—The International Society for Optical Engineering USA, vol. 2020, pp. 187-195, XP-002387335.

(Continued)

*Primary Examiner* — Alex Liew
(74) *Attorney, Agent, or Firm* — Nixon Peabody LLP; Jeffrey L. Costellia (57) ABSTRACT

A method of forming a combined image based on a plurality of image frames includes obtaining a sequence (22, –33) of arrays of intensity values for representing respective ones of a sequence of image frames depicting substantially the same scene. The combined image is represented by a final array (27, –28) of intensity values. At least some of the intensity values in the final array (27, –28) are each obtained by summing an intensity value from each of a sequence of arrays of intensity values based on respective ones of the arrays in the obtained sequence (22, –33). If, for any of at least one region in the final array (27;28), any of a sequence of sets of at least one intensity value, wherein each set represents the region and forms part of one of a selected plurality of the obtained arrays of intensity values, contains intensity values deviating by more than a certain measure from those in the other sets of the sequence, the intensity values representing that region in the final array (27; 28) are each derived from (A) a respective intensity value from each of one or more arrays based on respective ones of only those of the selected plurality of arrays containing a set with deviating intensity values, or (B) a respective intensity value from each of one or more arrays based on respective ones of only those of the selected plurality of arrays containing one of the other sets of intensity values.

14 Claims, 4 Drawing Sheets

U.S. PATENT DOCUMENTS

| | | | |
|---|---|---|---|
| 5,960,108 A * | 9/1999 | Xiong | 382/154 |
| 5,987,164 A * | 11/1999 | Szeliski et al. | 382/154 |
| 6,078,701 A * | 6/2000 | Hsu et al. | 382/294 |
| 7,388,603 B2 | 6/2008 | Cheung et al. | |
| 2004/0252199 A1 | 12/2004 | Cheung et al. | |

FOREIGN PATENT DOCUMENTS

| | | |
|---|---|---|
| JP | 2004-180259 | 6/2004 |
| JP | 2005-136679 | 5/2005 |

OTHER PUBLICATIONS

S. Iu et al., "Noise Reduction Using Multi-Frame Motion Estimation, with Outlier Rejection and Trajectory Correction", 1993 IEEE International Conference on Acoustics, Speech, and Signal Processing, vol. 5, 1993, pp. 205-208, XP0101110971.

Notice of Reasons for Rejection (Japanese Application No. 2008-534876) mailed Nov. 4, 2010.

* cited by examiner

METHOD OF FORMING A COMBINED IMAGE BASED ON A PLURALITY OF IMAGE FRAMES

The invention relates to a method of forming a combined image based on a plurality of image frames, including obtaining a sequence of arrays of intensity values for representing respective ones of a sequence of image frames depicting substantially the same scene, wherein the combined image is represented by a final array of intensity values, wherein at least some of the intensity values in the final array are each obtained by summing an intensity value from each of a sequence of arrays of intensity values based on respective ones of the arrays in the obtained sequence.

The invention also relates to a system for processing a sequence of arrays of intensity values, each array being suitable for representing one of a sequence of image frames depicting substantially the same scene, which system is configured to form a final array of intensity values representing combined image, wherein the system is configured to obtain at least some of the intensity values in the final array by summing an intensity value from each of a sequence of arrays of intensity values based on respective ones of the arrays in the obtained sequence.

The invention also relates to an imaging device, e.g. a digital camera.

The invention also relates to a computer program.

Respective examples of such a method, system and computer program are known from U.S. 2005/0030315. An image stack is input into the known system. An image stack is a set of identically sized registered images (e.g. the same pixel in each image represents more or less the same thing) that may originate from any stationary still or video camera. In the 3D pixel set the normal X and Y dimensions define the coordinates of a single image. The Z (or time) dimension defines which image in the stack (or what point in time in a video). A user applies one or more filters to the image stack to create one or more new images referred to as intermediate images. A user can then select one of the original images or an intermediate image to serve as a source image from which pixels may be composited or painted into a new resultant image. A TemporalSmooth filter delivers a weighted blend of the current slice and slices before and after the current one. The Median filter is useful for removing objects found in only one or a few images, for removing temporal events such as something that moves across the image in a video and for removing temporal noise. The Maximum Histogram filter delivers the pixel in the corresponding span that is most like the other pixels in the span. This filter is also useful for removing objects found in only one or a few images.

A problem of the Maximum Histogram filter and Median filter is that they deliver only a single pixel value from the span, meaning that some noise is still maintained. It is not possible to apply the TemporalSmooth filter to the result of the Median or Maximum Histogram filters, since they result only in a single image.

It is an object of the present invention to provide a method, system, imaging device and computer program of the type mentioned above that permit formation of a combined image with a relatively good Signal to Noise Ratio with a modified appearance for a moving object in the scene.

This object is achieved by the method according to the invention, which is characterised in that if, for any of at least one region in the final array, any of a sequence of sets of at least one intensity value, wherein each set represents the region and forms part of one of a selected plurality of the obtained arrays of intensity values, contains intensity values deviating by more than a certain measure from those in the other sets of the sequence, the intensity values representing that region in the final array are each derived from (A) a respective intensity value from each of at least one array based on respective ones of only those of the selected plurality of arrays containing a set with deviating intensity values, or (B) a respective intensity value from each of at least one array based on respective ones of only those of the selected plurality of arrays containing one of the other sets of intensity values.

The region may comprise only one pixel, represented by a single intensity value.

Because at least some of the intensity values in the final array are each obtained by summing an intensity value from each of a sequence of arrays of intensity values based on respective ones of the arrays in the sequence, the signal to noise ratio is increased at least for those parts of the final image represented by these intensity values. Because the deviation of intensity values by more than a certain measure is used as criterion for separating the sets of intensity values into two groups, with the corresponding representation of that region in the final array being based only on intensity values from one of the two groups, it is possible to ensure that outlying values due to noise are not mistaken for moving parts of a scene. In variant (A), in which the intensity values representing the region under consideration in the final array are each derived only from a respective intensity value from each of at least one array based only on an obtained array containing a set with deviating intensity values, modification of the appearance of the region is achieved in the sense that the moving part is more clearly visible. Intensity values corresponding to the background are discarded. In variant (B), in which the intensity values representing the region under consideration in the final array are each derived from a respective intensity value from each of at least one array based only on an obtained array containing one of the other sets of intensity values, moving objects are filtered from the combined image.

An additional advantage compared to the prior art is that the method can be performed on the basis of image frames that are underexposed or noisy. This is because at least some of the intensity values in the final array are each obtained by summing an intensity value from each of a sequence of arrays of intensity values based on respective arrays representing the image frames.

In an embodiment, the step of obtaining a sequence of arrays of intensity values includes obtaining a sequence of arrays of intensity values, each obtainable by exposing a light-sensitive surface of an image-capturing device over an associated exposure period from a start of exposure, such that a defined interval of time is established between the start of exposure for obtaining an array of intensity values and the end of the exposure period associated with the array of intensity values immediately preceding that array in the sequence.

In cases wherein if, for any of at least one region in the final array, any of a sequence of sets of at least one intensity value representing the region in the respective obtained image frames contains intensity value deviating by more than a certain measure from those in the other sets of the sequence, the intensity values representing that region in the final array are each derived from (A) a respective intensity value from each of one or more arrays based on respective ones of only those obtained arrays containing a set with deviating intensity values, the effect is to create a stroboscopic combined image. A sequence of sharp images of a moving object is captured onto the single combined image. Due to the fact that the arrays containing the other sets of intensity values are not used to derive intensity values in regions showing the moving object, the moving object is represented more clearly.

In cases wherein if, for any of at least one region in the final array, any of a sequence of sets of at least one intensity value representing the region in the respective obtained image frames contains intensity value deviating by more than a certain measure from those in the other sets of the sequence, the intensity values representing that region in the final array are each derived from (B) a respective intensity value from each of one or more arrays based on only those of the selected plurality of arrays containing one of the other sets of intensity values, the moving objects are removed. Ensuring that a defined interval of time is established between the start of exposure for obtaining an array of intensity values and the end of the exposure period associated with the array of intensity values immediately preceding that array in the sequence, has the effect that a sequence of arrays of intensity values captured over a longer total time interval serves as the basis for the combined image. This ensures that there is a sufficient number of image frames representing the background that is obscured by the moving object in some of the image frames.

In an embodiment, the step of obtaining the sequence of arrays of intensity values includes obtaining a first sequence of arrays of intensity values, each array being obtainable by exposing a light-sensitive surface of an image-capturing device over an associated exposure period from a start of exposure, obtaining an indication of a strobe level, and forming a second sequence of arrays of intensity values by reducing the number of arrays of the first sequence of arrays in accordance with the indicated strobe level.

The effect is that a stroboscopic effect can be provided during post-processing of a sequence of captured arrays of intensity values or sequence of arrays of intensity values derived from respective ones of a sequence of captured arrays of intensity values. Moreover, the stroboscopic effect is adjustable by means of the indication of the strobe level.

In an embodiment, if, for any of at least one region in the final array, any of a sequence of sets of at least one intensity value, wherein each set represents the region and forms part of one of the obtained arrays of intensity values, contains intensity values deviating by more than a certain measure from those in the other sets of the sequence, the intensity values representing that region in the final array are each derived by weighting a sum of intensity values based on the selected plurality of the obtained sequence of arrays with a factor proportional to the ratio of the number of sets in the sequence to the number of sets from which the intensity values representing that region in the final array are derived.

Thus, it is ensured that those regions of the final array for which none of a sequence of sets of at least one intensity value representing the region in the respective obtained image frames contains intensity values deviating by more than a certain measure from those in the other sets of the sequence, the intensity values representing that region in the final array can be derived by summation of a number of intensity values corresponding to the number of obtained arrays. The regions of the combined image for which any of a sequence of sets of at least one intensity value representing the region in the respective obtained image frames contains intensity values that do deviate from the rest are obtained on the basis of a smaller number of intensity values. Weighting ensures that they are not substantially weaker than the rest of the combined image.

In an embodiment, the step of obtaining a sequence of arrays of intensity values includes obtaining a first sequence of arrays of intensity values for representing respective image frames depicting substantially the same scene, selecting at least a part of the depicted scene, calculating a motion vector representative of relative movement of the part in the image frames depicting the scene, and forming a second sequence of arrays of intensity values for representing respective image frames in which at least the selected part has been aligned in accordance with the calculated motion vector.

This embodiment serves to identify more exactly objects moving across the selected part in the scene. The effect of movement of the selected part of the scene relative to the observer between successive image frames is removed by aligning at least the selected part. Subsequent detection of deviating intensity values is then more accurate.

In an embodiment, if, for any of at least one region in the final array, none of a sequence of sets of at least one intensity value, wherein each set represents the region and forms part of one of a selected plurality of the obtained arrays of intensity values, contains intensity values deviating by more than a certain measure from those in the other sets of the sequence, the intensity values representing that region in the final array are each obtained by summing an intensity value from each of a sequence of arrays of intensity values based on respective ones of the arrays in the obtained sequence.

Summation of intensity values has the effect of increasing the signal to noise ratio, in particular where the arrays of intensity values are based on values obtained by reading out signal values generated by an image-capturing device. Summing an intensity value from each of a sequence of arrays of intensity values based on respective ones of the arrays in the obtained sequence if, for any of at least one region in the final array, none of a sequence of sets of at least one intensity value representing the region in the respective obtained image frames contains intensity values deviating by more than a certain measure from those in the other sets of the sequence, has the effect that as many intensity values in the final array as possible are formed by summing. Thus, the overall signal to noise ratio of the combined image is improved to the largest extent possible.

In an embodiment, if, for any of at least one region in the final array, any of a sequence of sets of at least one intensity value, wherein each set represents the region and forms part of one of a selected plurality of the obtained arrays of intensity values, contains intensity values deviating by more than a certain measure from those in the other sets of the sequence, and if the other sets comprise a plurality of sets, the intensity values representing that region in the final array are each obtained by summing an intensity value from each of a plurality of arrays of intensity values based, respectively on an obtained array containing one of the other sets, wherein, preferably, the number of the plurality of arrays of intensity values corresponds to the number of other sets.

This embodiment has the effect of increasing the signal to noise ratio even where parts of the image are moving. The moving parts are removed, and the background is included in the combined image with a relatively high signal to noise ratio.

In an embodiment, the step of obtaining the sequence of arrays of intensity values includes obtaining at least one array of intensity values for representing an image frame depicting a scene at a first resolution corresponding to the number of intensity values in the array, and obtaining a further group of arrays of intensity values for representing respective image frames depicting substantially the same scene at resolutions corresponding to the number of intensity values in the arrays and lower than the first resolution, wherein the selected plurality of the obtained arrays are chosen from the further group.

The effect is that the detection and modification of the appearance of moving objects is carried out using arrays containing fewer intensity values. This decreases the amount of processing required to form the combined image. High-resolution image information is incorporated into the final array representing the combined image by virtue of the fact that at least some of the intensity values in the final array are each obtained by summing an intensity value from each of a sequence of arrays of intensity values based on respective ones of the arrays in the obtained sequence, which obtained sequence includes at least one array representing an image frame at the first, relatively high, resolution.

In a variant of this embodiment, at least one of the arrays of intensity values in the further group is obtained by obtaining a number of intensity signals for representing an image frame at a resolution corresponding to the number of intensity signals and forming the array of intensity values in such a way that intensity values in the array are based on respective sums of the obtained intensity signals.

The effect is to increase the Signal to Noise Ratio of those parts of the combined image in which a moving object is represented, or from which it has been removed. This is the case because the summation, also known as "binning" in one implementation, increases the signal to noise ratio of the representations of the lower-resolution image frames.

In another variant of the embodiment, if, for any of at least one region in the final array, none of a sequence of sets of at least one intensity value, wherein each set represents that region and forms part of one of a selected plurality of the further group of arrays of intensity values, contains intensity values deviating by more than a certain measure from those in the other sets of the sequence, a step of obtaining at least some of the intensity values representing that region in the final array includes summing an intensity value from each of at least one array of intensity values based on a respective one of the obtained arrays of intensity values for representing an image frame at the first resolution and at an intensity value from at least one array of intensity values based on a respective one of the obtained arrays of intensity values.

Thus, although the detection of moving objects is carried out on arrays representing low-resolution image frames, at least the background of the combined image is formed on the basis also of the arrays representing the high-resolution image frames.

According to another aspect, the system for processing a sequence of arrays of intensity values according to the invention is characterised in that the system is configured to determine if, for any of at least one region in the final array, any of a sequence of sets of at least one intensity value, wherein each set represents the region and forms part of one of a selected plurality of the obtained arrays of intensity values, contains intensity values deviating by more than a certain measure from those in the other sets of the sequence, and, upon so determining, to derive each of the intensity values representing that region in the final array from (A) a respective intensity value from each of at least one array based on respective ones of only those of the selected plurality of arrays containing a set determined to contain deviating values, or (B) a respective intensity value from each of at least one array based on respective ones of only those of the selected plurality of arrays containing one of the other sets of intensity values.

The system is thus configured to provide a combined image on the basis of a plurality of image frames depicting the same scene, wherein, if an object moving across the scene is depicted, it is either (A) enhanced by removing the background, or (B) removed to make the background more clearly visible. The overall combined image has a relatively good signal to noise ratio, as well as depicting parts of the scene across which an object has moved with relatively little blurring.

Preferably, the system is configured to carry out a method according to the invention.

An embodiment of the system is configured to obtain the sequence of arrays of intensity values
by obtaining a first sequence of arrays of intensity values, each array being obtainable by exposing a light-sensitive surface of an image-capturing device over an associated exposure period,
by obtaining an indication of a strobe level from a user, and
by forming a second sequence of arrays of intensity values by reducing the number of arrays in the first sequence of arrays in accordance with the strobe level indicated, and comprises a device for obtaining the indication of the strobe level, which device includes a part marked with a scale and an adjustable element for indicating a point on the scale.

This embodiment is particularly suitable for implementation in a consumer electronics device, such as a digital camera. It provides a convenient way for indicating the delay between exposures used to form the combined image. The device may be implemented as a graphical element in a graphical user interface.

According to another aspect of the invention, there is provided an imaging device, e.g. a digital camera, including a system according to the invention.

According to another aspect of the invention, there is provided a computer program, including a set of instructions capable, when incorporated in a machine-readable medium, of causing a system having information processing capabilities to perform a method according to the invention.

The invention will now be described in further detail with reference to the accompanying drawings, in which.

Figure 1:
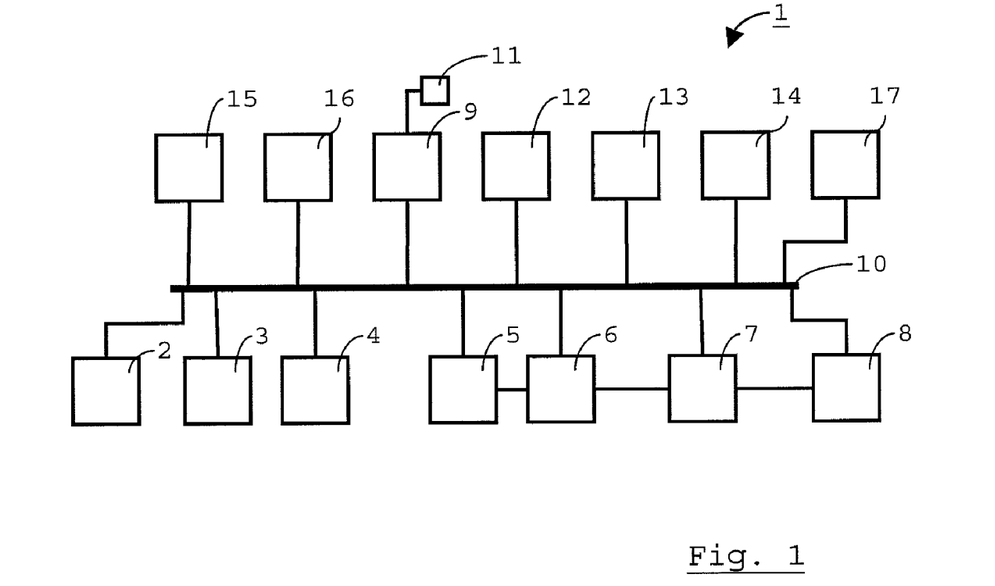
FIG. 1 illustrates schematically a digital camera as an example of a system for providing a combined image based on a plurality of image frames.

FIG. 1 illustrates some components of a digital camera 1 as an example of an apparatus comprising a system for implementing the methods described below. Other examples of suitable apparatus include scanners and photocopying apparatus, as well as general-purpose computer that have been programmed to process image files obtained using such apparatus. The description will focus on the application of methods of forming a combined image in the digital camera 1.

The digital camera 1 includes a lens system 2 for focussing on one or more objects in a scene that is to be represented by a combined image. When a shutter 3 is opened, the scene is projected through an aperture in a diaphragm 4 onto a photosensitive area of an image-capturing device 5. Instead of the shutter 3, an electronic shutter implemented by suitable control of the image-capturing device 5 could be used. The shutter time is controllable, as is the diameter of the aperture. The image-capturing device 5 can be a device implemented in Complementary Metal-Oxide Semiconductor (CMOS) technology, or a Charge-Coupled Device (CCD) sensor, for example.

The photosensitive area of the image-capturing device 5 is divided into areas occupied by pixel cells. Each pixel cell includes a device for generating a signal indicative of the intensity of light to which the area that the pixel cell occupies is exposed. An integral of the signal generated by a device is formed during exposure, for example by accumulation of photocurrent in a capacitor. Subsequent to exposure for the duration of an exposure time interval, the values of the integrals of the generated signals are read out row by row.

The (analogue) values that are read out are provided to an Analogue-to-Digital (A/D-)converter 6. The A/D converter samples and quantises the signals received from the image-capturing device 5. This involves recording the intensity values on a scale with discrete levels, the number of which is determined by the number of bits of resolution of the digital words provided as output by the A/D converter 6. Thus, the A/D-converter 6 provides as output an array of intensity values recorded on a scale occupying a first range. Each intensity value is associated with a particular pixel position in an image frame, corresponding to a photosensitive cell or a plurality of adjacent photosensitive cells. In the latter case, the values read out from the image-capturing device 5 are preferably obtained by "binning" the values corresponding to a plurality of adjacent photosensitive cells. The areas to which the "binned" values correspond may overlap.

Each exposure of the image-capturing device 5 thus results in an array of intensity values representing an image frame. As will be explained in more detail below, the intensity values of one or more arrays may be mapped to a different scale occupying a second range by a Digital Signal Processor (DSP) 7. In certain embodiments, the DSP 7 is also suitable for performing such operations as interpolation between pixel values and optionally compression of the image. It may also carry out a transformation of the intensity values to the spatial frequency domain, such as a Direct Cosine Transform (DCT).

Arrays of intensity values are stored in a storage device 8. The storage device can be any usual type of storage device, e.g. built-in flash memory, replaceable flash memory modules, an optical disk drive or a magnetic disk drive.

Capturing and processing of images is carried out under control of a microprocessor 9, which issues commands over a bus 10. The microprocessor 9 is assisted by a co-processor 11 in the illustrated embodiment. The co-processor 11 is preferably a digital signal processor for performing image compression, for example in accordance with the JPEG standard. The microprocessor 9 comprises a volatile memory and has access to instructions stored in Read-Only Memory (ROM) module 12. The instructions provide the digital camera 1 with the capability to perform a method of forming a combined image by adding a plurality of captured image frames, which method is carried out under the control of the microprocessor 9.

Other components connected to the bus 10 include an input interface module 13 for receiving user commands, and an output interface module 14 for returning status information. In the illustrated embodiment, a motion sensor 15 is present for sensing and measuring movement of the digital camera 1. In other embodiments, a series of image frames captured in rapid succession is analysed to determine the amount and/or direction of movement of the digital camera 1. In addition, the digital camera 1 comprises an exposure-metering device 16 and a flash driver 17 for directing the operation of a flash (not shown).

In use, a user issues a command to form a single image of a scene, which is passed on to the microprocessor 9 through the input interface module 13 and the bus 10. In response, the microprocessor 9 controls the digital camera 1 such that a plurality of underexposed image frames or image frames with a high ISO setting are captured. A high ISO setting means that the sensitivity of the image-capturing device 5, calibrated along the linear film speed scale according to international standard ISO 5800:1987 is set to a high level. The captured images represent respective scenes that overlap at least partially. Each image frame, specifically each colour component of an image frame, is represented by an array of pixel values. Each pixel value corresponds to the light intensity of the associated colour component over an area associated with a pixel. Given that each area associated with a pixel corresponds to a part of the area of the image-capturing device 5, which is constant, the number of intensity values contained in an array corresponds to the spatial resolution of the image frame. This is also the case where the intensity values are coefficients in the spatial frequency domain, since the inclusion of more values in an array corresponds to the presence of coefficients of a higher order.

To obtain the sequence of individually underexposed image frames, the microprocessor 9 determines a desired exposure for a final image to be formed on the basis of the image frames. This exposure is divided over the image frames. The desired exposure can be determined from user input or automatically on the basis of one or more values obtained from the exposure-metering device 16. Exposure levels for each of the image frames result in settings of the diaphragm 4, shutter speed and flash intensity. In addition, the microprocessor 9 determines amplification levels for the signals read out from the image-capturing device. These determine the range of values within which the intensity values in the arrays representing the image frames lie. The number of bits with which the intensity values are represented determines the dynamic range of the intensity values. In the example, it will be assumed that the intensity values are represented in eight bits, so that there are 255 possible non-zero values. Instead of underexposing the image frames, the linear-scale ISO setting (also known as ASA number) of the image-capturing device 5 can be increased by the same factor as the underexposure factor. This results in increased noise levels in the individual frames, which are reduced through the combination processes presented below.

Figure 2:
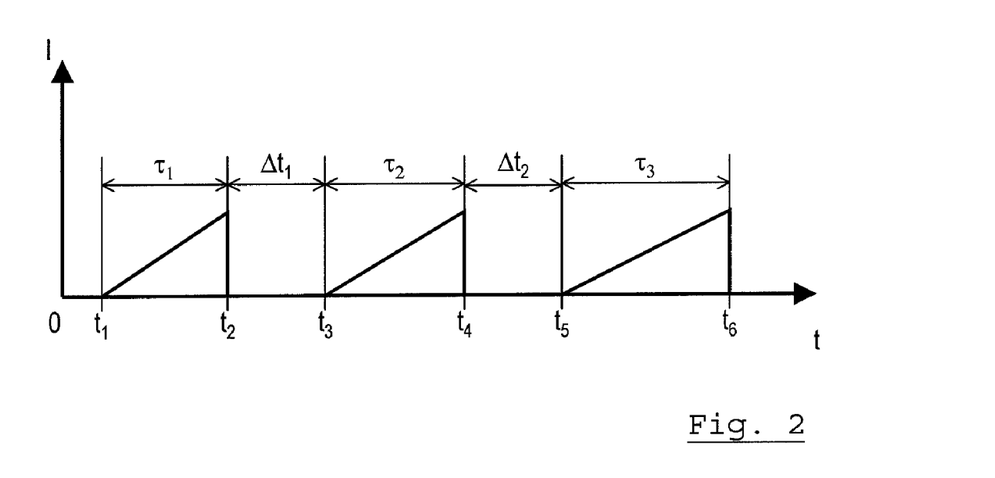
FIG. 2 illustrates a first method of obtaining a plurality of image frames from which to form a combined image.

FIG. 2 illustrates what, according to embodiment of the invention, the signal in the image-capturing device that is representative of the accumulated light falling on one pixel cell looks like. In cases where the values from a plurality of nearby cells are averaged, the signal depicted in FIG. 2 is representative of the pixel value for the pixel defined by the group of nearby pixel cells.

The light-sensitive surface defining a pixel is exposed first from a point in time $t_1$ to a point in time $t_2$ over a first exposure period $\tau_1$. The value read out at the end of the first exposure period $\tau_1$ is the intensity value for that pixel in a first array of intensity values representing an image frame. Incidentally, this description assumes that a colour filter is used for adjacent pixel cells, so that the several colour components of a pixel are captured simultaneously. In other embodiments, the colour components are captured sequentially, so that $\tau_1$ is actually approximately equal to one third of the duration of the first exposure period.

For forming an intensity value to be included in a second array of intensity values, the image-capturing device 5 is exposed over a second exposure period $\tau_2$ from a point in time $t_3$ to a point in time $t_4$. A time interval $\Delta t_1$ is established between the start $t_3$ of the second exposure period $\tau_2$ and the end $t_2$ of the first exposure period $\tau_1$. Similarly, a time interval $\Delta t_2$ is established between a point in time $t_5$ marking the start of a third exposure period $\tau_3$ and the end of the second exposure period $\tau_2$. The time intervals $\Delta t_1$, $\Delta t_2$ are defined in the sense that they are pre-programmed in ROM module 12, input through input interface module 13, or calculated by the microprocessor 9 on the basis of input data received through input interface module 13. The time intervals $\Delta t_1$, $\Delta t_2$ need not be equal.

The first to third exposure periods $\tau_1$-$\tau_3$ are not of equal duration in the illustrated embodiment. In this way, a sequence of arrays of intensity values of increasing maximum intensity is captured. Thus, a sequence of arrays of intensity values is captured, each representing a corresponding image frame, wherein the pixel values of each array lie on one of a sequence of scales of discrete values with increasing absolute maximum, the scales being applicable to respective successive sets of at least one image frame in the sequence of successive image frames. In this example, the set to which each scale is applicable contains but one image frame. In an alternative variant, the absolute maximum of the respective scales decreases. In this example, the exposure time increases substantially uniformly with each successive exposure. This will result in a combined image with relatively good colour and tonal depth. It is also possible to vary the lengths of the exposure periods $\tau_1$-$\tau_3$ in random fashion.

Various methods of stepping the exposure level from one image frame to the next in a sequence of captured image frames are described in international patent application PCT/EP04/51080, published as WO 05/122084, and herein incorporated by reference. The exposure level is determined by exposure time, aperture, (flash) lighting intensity, amplification gain before A/D conversion and the A/D conversion threshold of A/D converter 6. Stepping of the exposure level may be accomplished by varying any of these settings between successive exposures.

In one specific variant, the size of the aperture of the diaphragm 4 as well as the lighting conditions are kept substantially constant between exposures. FIG. 2 exemplifies such a variant. The number of exposures taken depends on the time required for a stable image to be captured. The number is selected to keep the individual exposure periods $\tau_1$-$\tau_3$ associated with the individual image frames below a certain threshold value. Preferably, this threshold value is pre-determined at 1/60 second as this is considered to be the lowest shutter speed to capture a steady image for the average photographer.

One algorithm for calculating the lengths of the exposure periods $\tau_1$-$\tau_3$ is to choose the maximum exposure period to be below a threshold value, say 1/60 second. The average length of the exposure period is set equal to the maximum exposure time divided by the number of image frames. In dependence on the desired total of the exposure periods, the exposure period length is stepped in equal increments to the maximum exposure period.

In a second specific variant, a different parameter of the image-capturing system, the aperture of the diaphragm 4, is adjusted before the start of each exposure period $\tau_1$-$\tau_3$ in such a manner that at least a maximum of the scale on which intensity values for each pixel are recorded changes substantially uniformly with each successive exposure. In the second specific variant, the exposure time is the same for each successive image frame. The aperture is stepped down uniformly, preferably in equal increments.

In a third specific variant, the intensity of artificial light used to illuminate the scene depicted in the successive image frames is stepped uniformly between exposures.

Returning to the embodiment illustrated in FIG. 2, it is observed that a variant is possible wherein multiple arrays of intensity values are read out during one of the exposure periods $\tau_1$-$\tau_3$, with no delay between the capturing of these image frames. The delays $\Delta t_1$-$\Delta t_2$ are then established between resets of the image-capturing device, i.e. only between selected ones of the sequence of arrays of intensity values that are captured. It is noted that the delays $\Delta t_1$-$\Delta t_2$ are well-defined, meaning that they correspond to a set value, rather than being the result of intrinsic properties of the image-capturing device. In practice the set value will be longer than the intrinsic delay that is due to resetting of the image-capturing device 5.

Figure 3:
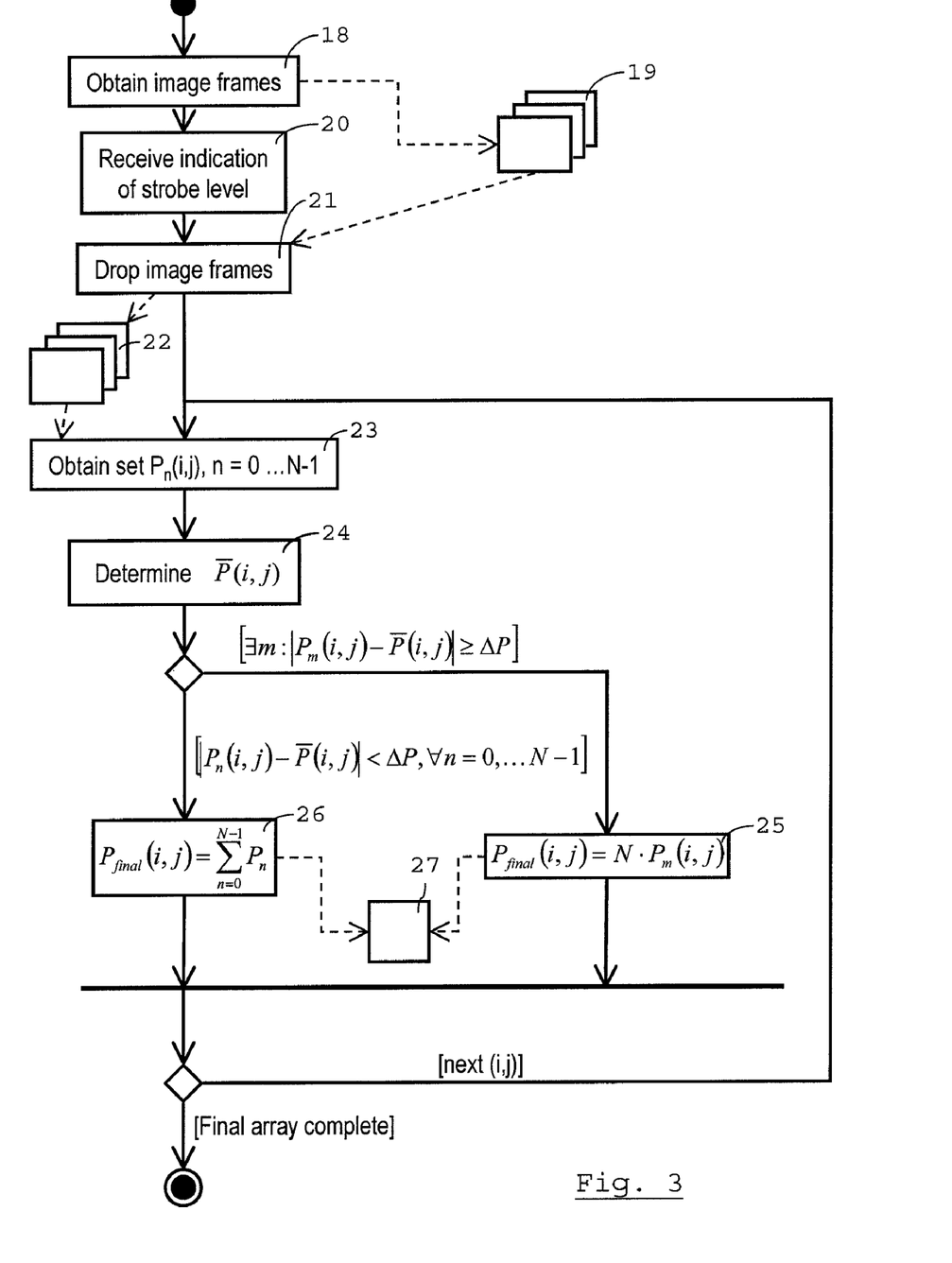
FIG. 3 is a flow chart illustrating a first method of forming a combined image.

FIG. 3 illustrates a method using an alternative process to obtain a sequence of arrays of intensity values obtainable by exposing a light-sensitive surface of the image-capturing device 5 over an associated period from a start of exposure, such that a defined interval of time is established between the start of exposure for obtaining an array of intensity values and the end of the exposure period associated with the array of intensity values immediately preceding that array in the sequence.

In a first step 18, an initial sequence 19 of arrays of intensity values is obtained, such as are obtainable by exposing a light-sensitive surface of the image-capturing device 5 over respective associated exposure periods from respective starts of exposure. Where the method is carried out in the digital camera 1 the arrays in the initial sequence 19 are obtained directly from the image-capturing device. The arrays may be obtained by means of a method as illustrated in FIG. 2, but are preferably captured without any delays between exposure periods other than those inherently occurring with each reset of the image-capturing device 5.

In a subsequent step 20, an indication of a desired strobe level is received by the microprocessor 9, preferably in the form of a signal provided through the input interface module 13 and bus 10. Preferably, the digital camera 1 includes a device for obtaining an indication of a strobe level from a user. In one embodiment, the user provides the indication of a strobe level by setting a dial (not shown) on the digital camera 1. In another embodiment, a slide (not shown) is used. Other types of input device including a marking corresponding to a scale and an adjustable element for indicating a point on the scale are also conceivable. This includes devices provided as part of a graphical user interface. In the illustrated example of a digital camera 1, it is ergonomically advantageous if at least the element for indicating a point on the scale is implemented as a mechanically adjustable component. The strobe level is representative of the desired separation between representations of a moving object in the combined image. Where, for example, the moving object is a ball that is to appear in the combined image, the strobe level indicates how close together various representations of the ball along its trajectory are to be.

In a next step 21, a second sequence 22 of arrays of intensity values for representing respective ones of a sequence of image frames is formed on the basis of the initial sequence 19 of arrays, so as to comprise a sequence of a reduced number of arrays relative to the initial sequence 19 of arrays. In particular, arrays of intensity values in between a first of the initial sequence 19 of arrays and a second one of the sequence 19 of arrays are dropped. The effect is to establish a delay between the image frames represented by the arrays in the second sequence 22. Thus, the second sequence 22 of arrays of intensity values corresponds to a sequence of arrays obtainable by exposing a light-sensitive surface of the image-capturing device 5 over an associated exposure period from a start of exposure, such that a defined interval of time (corresponding to the exposure period of the arrays "dropped" from the initial sequence 19) is established between the start of exposure for obtaining an array of intensity values and the end of the exposure period associated with the array of intensity values immediately preceding that array in the second sequence 22. In an embodiment using a dial as input device, for example, the scale marked next to the dial could correspond to the number of intermediate arrays to be dropped from the initial sequence 19 of arrays. For example, "1" would correspond to dropping every other array, whereas "9" would correspond to dropping nine arrays, so that the second sequence 22 includes only every tenth array from the initial sequence 19.

Next, it is determined (step 23) if, for any of at least one region in the final array, any of a sequence of sets of at least one intensity value representing the region in the respective image frames represented by the arrays in the second sequence 22 contains intensity values deviating by more than a certain measure from those in the other sets of the sequence.

In this example, the sets contain exactly one pixel value, i.e. intensity value corresponding to exactly one pixel position, and the step 23 is carried out for each pixel position (i, j) of an I×J array. It is assumed that the second sequence 22 contains N arrays, so that, for each pixel position (i, j), a sequence of N intensity values $P_n(i, j)$ is examined.

In the course of this examination, the average intensity value $\overline{P}(i, j)$ over the sequence $P_n(i, j)$ is determined (step 24). Which of two steps 25, 26 follows next depends on whether any of the intensity values $P_n(i, j)$ deviates by more than a certain measure from the others in that sequence. In a simple example, the measure is a multiple of the standard deviation of the intensity values $P_n(i, j)$ in the sequence.

Figure 4:
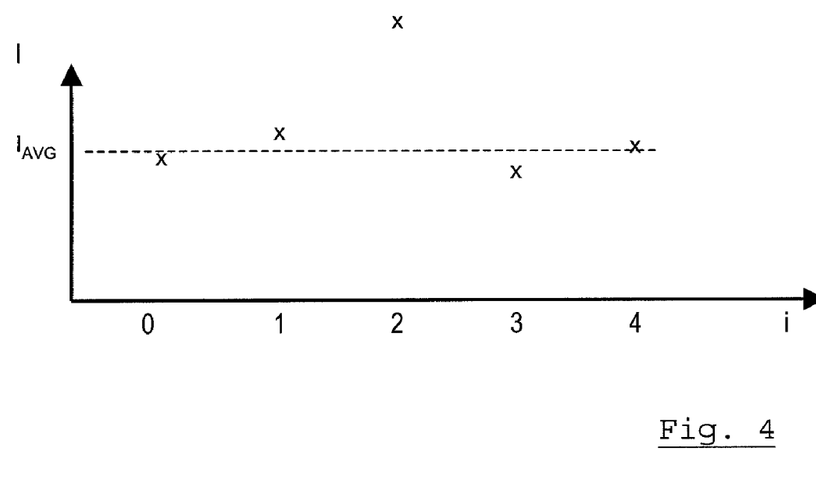
FIGS. 4 and 5 illustrate the application of a criterion used in methods of forming a combined image.

In FIG. 4 a situation is depicted for a first pixel position $(i_1, j_1)$, in which N=5, and $P_2(i_1, j_1)$ deviates by more than the pre-determined measure from the average value $\overline{P}(i_1, j_1) = I_{AVG}$. In the embodiment of FIG. 3, a corresponding intensity value $P_{final}(i_1, j_1)$ in a final array 27 of intensity values representing the combined image is based only on the deviating value $P_2(i_1, j_1)$. In the present case, only the third intensity value $P_2(i_1, j_1)$ in the sequence deviates by more than a certain measure from the other intensity values $P_n(i_1, j_1)$ in the sequence, so that the corresponding intensity value $P_{final}(i_1, j_1)$ in the final array 27 is based exclusively on the third intensity value $P_2(i_1, j_1)$. Where two or more, successive, intensity values deviate by more than the certain measure, the corresponding intensity value in the final array 27 may be based on all of the several deviating intensity values. In the situation depicted in FIG. 4, a first step 25 of the two alternative steps 25, 26 will be carried out. Since each of the image frames in the initial sequence 19 of image frames, and thus also in the second sequence 22 of image frames, is underexposed, the single intensity value $P_2(i_1, j_1)$ on which the corresponding intensity value $P_{final}(i_1, j_1)$ in the final array 27 is based, is preferably enhanced. For this reason, it is multiplied by the ratio of the number of image frames in the second sequence 22 to the number of image frames on which it is based. In the illustrated case, each intensity value $P_{final}(i, j)$ in the final array 27 is based always on at most one deviating intensity value $P_n(i, j)$, multiplied therefore by N, the number of arrays in the second sequence 22.

If, at the fork in the flow chart succeeding the step 24 of determining the average intensity value $\overline{P}(i, j)$ of a sequence of intensity values $P_n(i, j)$, it is determined that none of the sequence pixel values $P_n(i, j)$ deviates by more than the certain measure from the other values in the sequence, the corresponding intensity value $P_{final}(i, j)$ is obtained by summing an intensity value from each of a plurality of arrays of intensity values based, respectively, on one of the arrays in the second sequence 22 and corresponding in number to the arrays in the second sequence 22. In fact, in the illustrated embodiment, they are not just based on the arrays in the second sequence 22, but identical to them. It is noted that in other embodiments, wherein sets of more than one intensity value representing a region are analysed, a transform or some other operation may be carried out first. In that case, summation is carried out on the values obtained by applying the transform.

Figure 5:
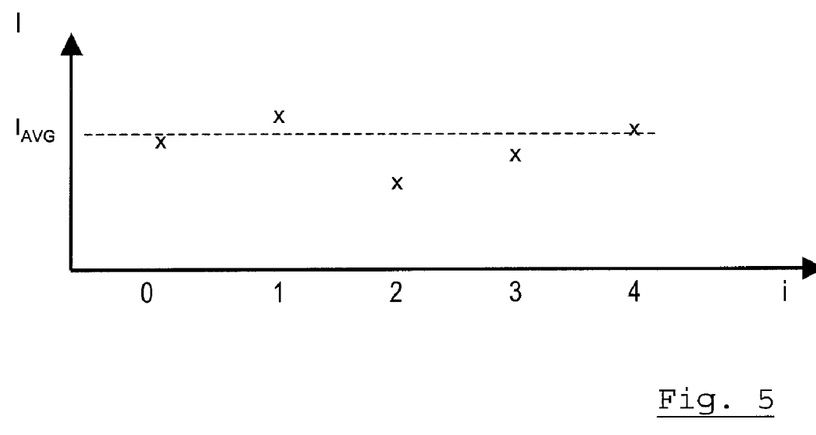

A situation in which the second step 26 of the two alternative steps 25, 26 is applied, is illustrated in FIG. 5. FIG. 5 shows intensity values $P_n(i, j)$ at a pixel position $(i_2, j_2)$. None of the intensity values $P_n(i_2, j_2)$, n=0 . . . 4 deviates more than a certain measure from the average intensity value $\overline{P}(i_2, j_2)$ for that pixel position. In that case, the intensity value $P_{final}(i_2, j_2)$ is obtained by summing each of the intensity values $P_n(i_2, j_2)$, n=0 . . . 4.

The steps 23, 24 and one of 25 and 26 are repeated for each pixel position (i, j), until the final array 27 is complete. In other embodiments, the steps may be applied per one of I×J blocks of intensity values. Each block contains a set of several intensity values, representing a region in one of a sequence of image frames. If the intensity values in one block deviate by more than a certain measure from those in the corresponding blocks in the other arrays of intensity values in a sequence, then a step similar to the step 25 is carried out. The corresponding block in the final array representing the combined image is based exclusively on the block containing the deviating intensity values. The average of the intensity values in a block could, for example, be compared to detect a deviation that is indicative of the presence of a moving object.

The method outlined in FIG. 3 is useful for generating a stroboscopic combined image, showing a moving object at several positions along its trajectory. Each representation of the moving object at one of those positions is relatively clear, as the background has effectively been filtered from the image frames on the basis of which the combined image has been formed. The contrast between the moving object and the background is stronger due to the weighting carried out in the step 26.

It has been mentioned that, in the first step 18, an initial sequence 19 of arrays of intensity values is obtained, such as are obtainable by exposing a light-sensitive surface of the image-capturing device 5 over respective associated exposure periods from respective starts of exposure. In one embodiment, the arrays of intensity values are obtained by exposing a light-sensitive surface of the image-capturing device 4 over respective associated periods from respective starts of exposure. Subsequently, the image frames represented by the arrays of intensity values are aligned relative to one another, so that the sequence 19 of arrays is actually formed by arrays of intensity value representing the image frames subsequent to an alignment step (not shown). In alternative embodiments, a selected part of each image frame is aligned with the corresponding part in the other image frames.

For the alignment, a commonly known method such as RANSAC (Random Sample Consensus) may be used. M. A. Fischler, R. C. Bolles. "Random Sample Consensus: A Paradigm for Model Fitting with Applications to Image Analysis and Automated Cartography", Comm. of the ACM, Vol 24, pp 381-395, 1981, is the first publication of this algorithm. In the course of such alignment, a first sequence of arrays of intensity values for representing respective image frames depicting substantially the same scene is obtained, for example directly from the image-capturing device 5. At least part of the depicted scene is selected, either by the user or automatically, and a motion vector representative of relative movement of the part in the image frames depicting the scene is calculated. The motion vector comprises a number of components, each a time-varying function or time series, for representing a component of translation and/or rotation of the image. A second sequence of arrays is formed for representing respective image frames in which at least the selected part has been aligned in accordance with the calculated motion vector.

An alternative method to the above-mentioned RANSAC method is described in international patent application PCT/EP04/51080, published as WO 05/122084. According to that method, the step of calculating the motion vector includes a step of determining at least a first term in a series expansion representing at least one element of the motion vector, which step includes an estimation process wherein at least the selected part in each of a plurality of image frames is repositioned in accordance with the calculated motion vector and values of corresponding pixels in at least the repositioned parts are summed to form a combined image. The estimation process includes calculation of a measure of the energy contained in an upper range of the spatial frequency spectrum of the combined image and the step of determining at least the first term includes at least one further iteration of the estimation process to maximise the energy. In one implementation, the series expansion is a Fourier sum representing at least one time-varying motion vector, each image frame being associated with a point in time. The step of calculating the motion vector optionally includes determining a further term in the series expansion, with the estimation process being iteratively executed using a motion vector with ad adjusted value of the further term to maximise the energy.

The alignment may also be carried out in a step (not shown) following upon the step 21 of forming the second sequence 22 of arrays. This requires less computational effort. For the same purpose, the arrays in the initial sequence 19 are preferably obtained by obtaining a plurality of arrays of intensity values for representing colour image frames in a first colour space, and applying a transformation to a plurality of arrays of values in a second colour space, wherein, in the first colour space, an image frame is represented by parameter value combinations, each parameter indicating the intensity of one of a plurality of colour components, whereas, in the second colour space, an image frame is represented by parameter value combinations, one parameter of the combination indicating a hue and at least one of the other parameters being indicative of light intensity.

This embodiment has the advantage that the computations and analysis involving the intensity values need be carried out on fewer arrays of intensity values. Instead of separate arrays of intensity values for each colour component, or arrays of intensity value combinations, only the array or arrays of parameter values indicative of light intensity in the second colour space, or arrays derived based thereon, need be processed. The colour information is contained in an array of parameter values indicating hues, which need not be scaled to prevent saturation of the combined image.

In the specific embodiment, arrays of intensity values representing image frames in the RGB (Red Green Blue) colour space are transformed to respective arrays of parameter values representing image frames in the HLS (Hue, Lightness, Saturation) colour space. The RGB colour space is an additive colour space, wherein the intensity of each of the three colour components is encoded separately. If the entire method depicted in FIG. 3 were to be carried out in the RGB colour space, then the method would in essence have to be carried out in triplicate. In the HLS colour space, an image is represented by the parameter combination Hue, indicating the relative strengths of three colour components, Saturation, providing a scale from a grey level to a full colour, and Lightness (also called Luminance) corresponding substantially to the average intensity of the colour components. Only the arrays of Lightness values are processed in accordance with the method of FIG. 3. It is noted that the HSV (Hue, Saturation, Value) colour space is usable as an alternative to the HSL colour space, and that the CMYK and YUV colour spaces are alternatives to the RGB colour space.

In an enhanced variant (not shown) of the embodiment illustrated in FIG. 3, the step 18 of obtaining a sequence of arrays of intensity values includes obtaining at least one array of intensity values for representing an image frame depicting a scene at a first resolution corresponding to the number of intensity values in the array, and obtaining a further group of arrays of intensity values for representing respective image frames depicting substantially the same scene at resolutions corresponding to the number of intensity values in the arrays and lower than the first resolution. Steps corresponding to the steps 20, 21 of receiving an indication of a strobe level and dropping image frames are carried out only on a sub-sequence formed by the arrays for representing image frames at the lower resolution. Also, the resulting sequence comprising only arrays for representing image frames at the lower resolution is subjected to steps corresponding to the steps 23-26 to form intensity values representing moving parts of the scene. Subsequently, the sum frame formed using a method similar to that of FIG. 3 is combined with the image frames at the first resolution. Thus, a further array is formed in which each intensity value is the sum of an intensity value in an array based on the sum array and at least one intensity value from an array representing an image frame at the first resolution. In a variant, this is only the case for those intensity values representing a region for which it is determined that none of a sequence of sets of at least one intensity value, wherein each seat represents the region and forms part of one of a selected plurality of the second sequence 22 of arrays of intensity values, contains intensity values deviating by more than a certain measure from those in the other sets of the sequence. In that variant, moving parts are represented in the combined image exclusively on the basis of the lower resolution image frames, whereas the background parts are formed on the basis of both the image frames with a high resolution and those with a lower resolution.

To take account of the fact that the sum of the low-resolution image frames is at lower resolution than the first resolution, an array based on the sum array is formed, suitable for representing a combined image frame at a resolution corresponding to that of an array based on an array representing an image frame at the first resolution. In one variant, interpolation is used to increase the resolution at which the combined image is represented. In another variant, the sum array undergoes a transform to the spatial frequency domain, as do the arrays representing image frames at the first resolution. Corresponding spatial frequency components are added. The higher spatial frequency components of the sum array are obtained only from the transformed arrays representing image frames at the first resolution. The sum array is then transformed back to the spatial domain. Such a method is described in more detail in international patent application PCT/EP05/52121, filed on 10 May 2005, and published as WO 06/119802.

An embodiment in which the method illustrated in FIG. 3 is carried out only on a sequence of arrays of intensity values representing respective image frames at a relatively low resolution, wherein at least (background) regions of the combined image are formed by summing intensity values from at least one array for representing an image frame at a first, higher, resolution, has certain advantages. The amount of processing capacity used to implement the method illustrated in FIG. 3 is reduced. By basing at least parts of the image formed by combining the combined image with image frames of a higher resolution, background details are captured.

To ensure that the moving parts based on the low-resolution image frames have a relatively high signal to noise ratio, a method referred to colloquially as "binning" is preferably used. In accordance with this method, arrays of intensity values representing the low-resolution image frames are obtained by obtaining a first array of intensity values at a resolution corresponding to the number of intensity values in the first array, and converting the first array of intensity values to a second array of intensity values for representing the image frame at a lower resolution, such that intensity values in the second array are based on respective sums of intensity values from the first array. One way of carrying out this "binning" involves the use of an image-capturing device provided with a photosensitive area and an array of pixel cells. Each pixel cell includes a device for generating a signal indicative of the intensity of light falling on an associated part of the photosensitive area. The image-capturing device is further provided with readout circuitry for generating an array of pixel values to capture an image frame at a set spatial resolution. Each pixel value represents an integral of the signal or signals generated in at least one of the pixel cells in an associated one of a number of areas over an exposure time interval. The number of areas together cover a region of the photosensitive area corresponding to a region in the image. The image-capturing device is directed to generate an array of pixel values in such a manner that each pixel value is representative of the integral of the sum of the signals generated by at least two devices in pixel cells.

Figure 6:
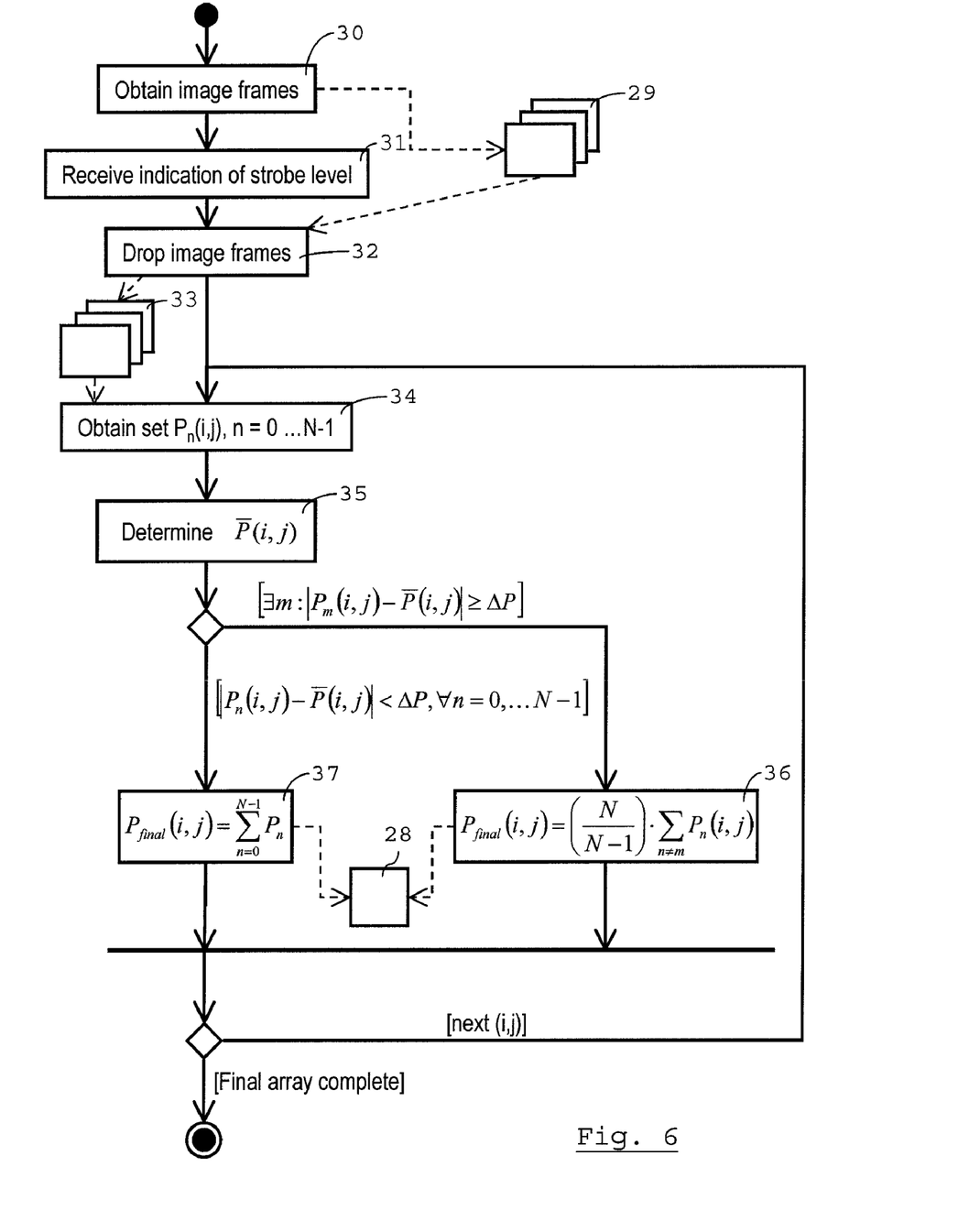
FIG. 6 is a flow chart illustrating a second method of forming a combined image.

FIG. 6 shows the application of the principle underlying the method of FIG. 3 to achieve a different effect in a combined image represented by a final array 28 of intensity values. The combined image is based on a sequence of image frames represented by an initial sequence 29 of arrays of intensity values obtained in a first step 30. The first step corresponds to the first step 18 of the method illustrated in FIG. 3. Thus, the initial sequence of arrays of intensity values may be obtained by means of any of the methods outlined above with respect to that step 18. This includes the alignment in particular.

In a second step 31, an indication of a strobe level is received, either from a user or as a result of a calculation based on default or user settings. Subsequently (step 32), a second sequence 33 of arrays of intensity values for representing respective ones of a sequence of image frames depicting substantially the same scene is obtained. It is obtained by reducing the number of arrays of the initial sequence 29 in accordance with the strobe level. Instead of the steps 30-32 illustrated in FIG. 6, the method explained above with respect to FIG. 2 is used in another embodiment. At any rate, the second sequence 33 of arrays of intensity values is obtainable by exposing a light-sensitive surface of an image-capturing device over an associated exposure period from a start of exposure, such that a defined interval of time is established between the start of exposure for obtaining an array of intensity values and the end of the exposure period associated with the array of intensity values immediately preceding that array in the sequence. The individual image frames are underexposed, but the total time span covered by the sequence of arrays is still large, due to the established delays. The purpose of the method of FIG. 6 being to remove moving objects from the combined image, this ensures that the background against which they are moving is represented by at least some of the arrays in the second sequence 33. Thus, the strobe level should be set in accordance with the velocity with which objects move across a scene, as well as their size relative to the scene. For smaller, fast-moving objects, fewer arrays need be dropped in the illustrated step 32.

Steps 34, 35 similar to steps 23, 24 in FIG. 3, are repeated for each pixel position (i, j), and followed by one of two steps 36, 37 with each iteration. If it is determined that for any pixel position (i, j) any of a sequence of pixel values $P_n(i, j)$ deviates by more than a certain measure from the other pixel values $P_n(i, j)$, a corresponding final intensity value $P_{final}(i, j)$ is derived only from an intensity value from each of at least one of the other pixel values, which do not deviate. For example, a deviation from the average $\bar{P}(i, j)$ by more than a particular multiple of the standard deviation of the sequence of intensity values $P_n(i, j)$ could be a cue to execute a first step 36 of the two alternative steps 36, 37. In this first step 36, the final intensity value $P_{final}(i, j)$ is obtained by summing an intensity value from each of a plurality of arrays of intensity values based, respectively, on one of the arrays in the second sequence 33 that does not contain a deviating pixel value, wherein preferably the number of summands corresponds to the number of non-deviating pixel values. The sum is weighted with a factor proportional to the ratio of the number of arrays in the second sequence to the number of intensity values that are added to form the final intensity value $P_{final}(i, j)$.

If, for any pixel position (i, j), none of a sequence of intensity values $P_n(i, j)$ associated with that position deviates by more than a certain measure from the average $\bar{P}(i, j)$, the other step 37 is executed. The corresponding final intensity value $P_{final}(i, j)$ is then obtained by summing an intensity value from each of a sequence of arrays based on respective ones of all the arrays in the second sequence 33. Again, in this case, they are not only based on the arrays of the second sequence 33, but are identical to them.

The steps 34, 35 and one of 36, 37 are repeated for each pixel position (i, j), until the entire final array 28 has been formed. As in the method outlined in FIG. 3, the steps 34-37 may be performed on blocks of intensity values rather than individual intensity values.

The invention is not limited to the embodiments described above, which may be varied within the scope of the accompanying claims. For instance, the summation of intensity values may be carried out in the frequency domain. In that case, if, for any pixel position in the final array, any of a sequence of intensity values in the spatial domain representing that pixel in the respective obtained arrays of intensity values deviates by more than a certain measure from the other ones in the sequence, either the non-deviating intensity values in the other arrays are replaced by the deviating value, an average of several deviating values, or a selected one of several deviating values, or the deviating intensity values are replaced by one of the non-deviating values or an average of the non-deviating values. Once all pixel positions have been analysed, the transformation of the adjusted image frames to the spatial frequency domain is carried out. Then a summation and subsequent transformation back to the spatial domain are carried out.

The invention claimed is:

1. Method of forming a combined image based on a plurality of image frames, including obtaining a sequence (22; 33) of arrays of intensity values for representing respective ones of a sequence of image frames depicting substantially the same scene, wherein the combined image is represented by a final array (27;28) of intensity values, wherein at least some of the intensity values in the final array (27;28) are each obtained by summing an intensity value from each of a sequence of arrays of intensity values based on respective ones of the arrays in the obtained sequence (22;33), wherein, if, for any of at least one region in the final array (27;28), any of a sequence of sets of at least one intensity value, wherein each set represents the region and forms part of one of a selected plurality of the obtained arrays of intensity values, contains intensity values deviating by more than a certain measure from those in the other sets of the sequence, the intensity values representing that region in the final array (27; 28) are each derived from
(A) a respective intensity value from each of at least one array based on respective ones of only those of the selected plurality of arrays containing a set with deviating intensity values, or
(B) a respective intensity value from each of at least one array based on respective ones of only those of the selected plurality of arrays containing one of the other sets of intensity values.

2. Method according to claim 1, wherein the step of obtaining a sequence (22;33) of arrays of intensity values includes obtaining a sequence of arrays of intensity values, each obtainable by exposing a light-sensitive surface of an image-capturing device (5) over an associated exposure period ($\tau_1$-$\tau_3$) from a start of exposure ($t_1,t_3,t_5$), such that a defined interval of time ($\Delta t_1, \Delta t_2$) is established between the start of exposure ($t_3,t_5$) for obtaining an array of intensity values and the end ($t_2,t_4$) of the exposure period associated with the array of intensity values immediately preceding that array in the sequence (22; 33).

3. Method according to claim 2, wherein the step of obtaining the sequence (22;33) of arrays of intensity values includes obtaining a first sequence (19;29) of arrays of intensity values, each array being obtainable by exposing a light-sensitive surface of an image-capturing device (5) over an associated exposure period from a start of exposure, obtaining an indication of a strobe level, and forming a second sequence (22, 33) of arrays of intensity values by reducing the number of arrays of the first sequence (19,29) of arrays in accordance with the indicated strobe level.

4. Method according to claim 1, wherein if, for any of at least one region in the final array (27;28), any of a sequence of sets of at least one intensity value, wherein each set represents the region and forms part of one of a selected plurality of the obtained arrays of intensity values, contains intensity values deviating by more than a certain measure from those in the other sets of the sequence, the intensity values representing that region in the final array (27;28) are each derived by weighting a sum of intensity values based on the selected plurality of the obtained arrays with a factor proportional to the ratio of the number of sets in the sequence (22;33) to the number of sets from which the intensity values representing that region in the final array are derived.

5. Method according to claim 1, wherein the step of obtaining a sequence (22;33) of arrays of intensity values includes obtaining a first sequence of arrays of intensity values for representing respective image frames depicting substantially the same scene,
selecting at least a part of the depicted scene,
calculating a motion vector representative of relative movement of the part in the image frames depicting the scene, and
forming a second sequence of arrays of intensity values for representing respective image frames in which at least the selected part has been aligned in accordance with the calculated motion vector.

6. Method according to claim 1, wherein if, for any of at least one region in the final array (27;28), none of a sequence of sets of at least one intensity value, wherein each set represents the region and forms part of one of a selected plurality of the obtained arrays of intensity values, contains intensity values deviating by more than a certain measure from those in the other sets of the sequence, the intensity values representing that region in the final array (27;28) are each obtained by summing an intensity value from each of a sequence of arrays of intensity values based on respective ones of the arrays in the obtained sequence (22;33).

7. Method according to to of claim 1, wherein, if, for any of at least one region in the final array (27;28), any of a sequence of sets of at least one intensity value, wherein each set represents the region and forms part of one of a selected plurality of the obtained arrays of intensity values, contains intensity values deviating by more than a certain measure from those in the other sets of the sequence, and if the other sets comprise a plurality of sets, the intensity values representing that region in the final array (27;28) are each obtained by summing an intensity value from each of a plurality of arrays of intensity values based, respectively on an obtained array containing one of the other sets, wherein, preferably, the number of the plurality of arrays of intensity values corresponds to the number of other sets.

8. Method according to claim 1, wherein the step of obtaining the sequence of arrays of intensity values includes obtaining at least one array of intensity values for representing an image frame depicting a scene at a first resolution corresponding to the number of intensity values in the array, and obtaining a further group of arrays of intensity values for representing respective image frames depicting substantially the same scene at resolutions corresponding to the number of intensity values in the arrays and lower than the first resolution, wherein the selected plurality of the obtained arrays are chosen from the further group.

9. Method according to claim 8, wherein at least one of the arrays of intensity values in the further group is obtained by obtaining a number of intensity signals for representing an image frame at a resolution corresponding to the number of intensity signals and forming the array of intensity values in such a way that intensity values in the array are based on respective sums of the obtained intensity signals.

10. Method according to claim 8, wherein if, for any of at least one region in the final array, none of a sequence of sets of at least one intensity value, wherein each set represents that region and forms part of one of a selected plurality of the further group of arrays of intensity values, contains intensity values deviating by more than a certain measure from those in the other sets of the sequence, a step of obtaining at least some of the intensity values representing that region in the final array includes summing an intensity value from each of at least one array of intensity values based on a respective one of the obtained arrays of intensity values for representing an image frame at the first resolution and at an intensity value from at least one array of intensity values based on a respective one of the obtained arrays of intensity values.

11. System for processing a sequence (22;33) of arrays of intensity values, each array being suitable for representing one of a sequence of image frames depicting substantially the same scene, which system is configured to form a final array (27;28) of intensity values representing a combined image, wherein the system is configured to obtain at least some of the intensity values in the final array (27;28) by summing an intensity value from each of a sequence of arrays of intensity values based on respective ones of the arrays in the obtained sequence (22;33), characterised in that the system is configured to determine if, for any of at least one region in the final array (27;28), any of a sequence of sets of at least one intensity value, wherein each set represents the region and forms part of one of a selected plurality of the obtained arrays of intensity values, contains intensity values deviating by more than a certain measure from those in the other sets of the sequence, and, upon so determining, to derive each of the intensity values representing that region in the final array from (A) a respective intensity value from each of at least one array based on respective ones of only those of the selected plurality of arrays containing a set determined to contain deviating values, or (B) a respective intensity value from each of at least one array based on respective ones of only those of the selected plurality of arrays containing one of the other sets of intensity values.

12. System according to claim 11, configured to obtain the sequence of arrays of intensity values by obtaining a first sequence (19;29) of arrays of intensity values, each array being obtainable by exposing a light-sensitive surface of an image-capturing device (5) over an associated exposure period, by obtaining an indication of a strobe level from a user, and by forming a second sequence (22;33) of arrays of intensity values by reducing the number of arrays in the first sequence (19;29) of arrays in accordance with the strobe level indicated, wherein the system comprises a device for obtaining the indication of the strobe level, which device includes a part marked with a scale and an adjustable element for indicating a point on the scale.

13. Imaging device, including a system according to claim 11.

14. Computer program, including a set of instructions capable, when incorporated in a machine-readable medium, of causing a system having information processing capabilities to perform a method according to claim 1.

* * * * *